United States Patent [19]

Katsaros et al.

[11] Patent Number: 5,209,958
[45] Date of Patent: May 11, 1993

[54] MULTILAYER LAMINATES FROM BLOW MOLDABLE THERMOPLASTIC POLYAMIDE AND POLYVINYL ALCOHOL RESINS

[75] Inventors: James D. Katsaros, Beaumont, Tex.; Vinodkumar Mehra, Wilmington, Del.

[73] Assignee: E. I. du Pont de Nemours and Company, Wilmington, Del.

[21] Appl. No.: 892,306

[22] Filed: Jun. 2, 1992

[51] Int. Cl.$^5$ .......................... B32B 1/02; B32B 27/08
[52] U.S. Cl. ........................... 428/36.91; 156/244.11; 264/176.1; 428/474.4; 428/475.5; 428/475.8
[58] Field of Search ................... 428/36.7, 36.4, 474.7, 428/516, 475.5, 36.91, 475.8, 474.4; 264/523, 515, 244.11, 176.1; 156/244.11

[56] References Cited

U.S. PATENT DOCUMENTS

| | | | |
|---|---|---|---|
| 4,243,724 | 1/1981 | Strutzel et al. | 428/474.7 |
| 4,410,482 | 10/1983 | Subramanian | 264/515 |
| 4,444,817 | 4/1984 | Subramanian | 428/36.4 |
| 4,804,703 | 2/1989 | Subramanian | 524/444 |
| 4,950,513 | 8/1990 | Mehra | 428/36.7 |
| 4,971,864 | 11/1990 | McCord | 428/516 |
| 5,094,806 | 3/1992 | Laughner | 264/523 |

FOREIGN PATENT DOCUMENTS

| | | |
|---|---|---|
| 0015556 | 9/1980 | European Pat. Off. |
| WO88/03543 | 5/1988 | PCT Int'l Appl. |
| WO90/07555 | 7/1990 | PCT Int'l Appl. |

*Primary Examiner*—Thomas J. Herbert, Jr.
*Attorney, Agent, or Firm*—Craig Evans

[57] ABSTRACT

Multilayer laminates formed from at least two layers. The first layer being a flexible blow moldable thermoplastic polyamide composition and the second layer being a vinyl alcohol composition. These laminates can withstand high temperatures for extended periods of time, possess low temperature impact strength, and have resistance to permeation of fuel compositions. These laminates are especially suited for fuel tanks for motor vehicles.

17 Claims, No Drawings

MULTILAYER LAMINATES FROM BLOW MOLDABLE THERMOPLASTIC POLYAMIDE AND POLYVINYL ALCOHOL RESINS

FIELD OF THE INVENTION

This invention relates to laminates formed from at least two layers. The first layer is a flexible blow moldable thermoplastic polyamide composition, and the second layer is a polyvinyl alcohol or copolymer of vinyl alcohol. Also disclosed is a process for making such laminates. In addition, articles made from such laminates, such as fuel tanks for motor vehicles, are disclosed; such laminates exhibit resistance to permeation of fuel compositions and have good high and low temperature mechanical properties.

BACKGROUND OF THE INVENTION

This invention concerns novel laminates which can withstand high temperatures for extended periods of time, possess good low temperature impact strength, and have good resistance to permeation of fuel compositions, especially in automotive applications. The laminates disclosed in the present application contain at least two layers. One layer is a blow moldable thermoplastic polyamide composition, and the second layer is a polyvinyl alcohol (PVOH) or copolymer of vinyl alcohol.

Processes for preparing a blow moldable thermoplastic polyamide composition are known in the art. In addition, multi-layer articles of at least a permeation barrier resin, namely the PVOH or copolymer of vinyl alcohol, hereinafter referred to as vinyl alcohol compositions, and at least a polyolefin are also known. However, no art exists which discloses a multi-layer laminate of a vinyl alcohol composition and a thermoplastic blow moldable polyamide composition.

In addition, there is no prior art on laminates comprising at least one layer of a blow moldable thermoplastic polyamide composition which have good high temperature tensile properties, low temperature impact strength and good fuel permeation resistance. However, U.S. Pat. Nos. 4,243,724 and 4,243,074 disclose laminates made from at least two layers comprising a polyamide compound and a polyamide/polyvinyl alcohol. These references do not teach the use of a blow moldable thermoplastic polyamide or the use of at least one layer being a vinyl alcohol or copolymers of vinyl alcohol which are not further melt blended with a second polyamide.

Moreover, the present application discloses laminates which can be made into large containers, in particular, fuel tanks. In order to blow mold such large containers, excellent melt strength is required. Thus, the laminates disclosed in the present application incorporate a fibrillatable fluoropolymer to the thermoplastic polyamide composition in one of the layers in order to achieve the necessary melt strength in order for the laminate to be blow molded into a large container.

As such, the laminates disclosed in the present application are particularly suitable for fuel tanks for motor vehicles.

Currently, there is a market for plastic fuel tanks which can withstand high temperatures (130° C.) for an extended period of time. The current plastic gas tank is generally made of high density polyethylene (HDPE), which melts at 125° C., and requires expensive heat shielding to provide protection from high temperatures generated by the engine and exhaust components of motor vehicles. Much of the auto industry has committed to plastic gas tanks because of their improved safety, design flexibility, lower weight, lower corrosivity, and higher volume tanks in a given area compared to metal tanks.

A high temperature resistant fuel tank has the following characteristics: 1) ability to withstand continuous use exposure at 130° C.; 2) low temperature impact strength, i.e. the tank must pass (no cracks) a 6 meter drop at −40° C., filled with ethylene glycol; and 3) good fuel permeation resistance. In addition, the thermoplastic polymer compositions used to make these laminates must have good melt strength sufficient to blow mold tanks which typically range in size from 8 to 20 gallons.

HDPE is a well-known resin which is commonly used to make plastic fuel tanks. With respect to the characteristics described above, HDPE possesses adequate melt strength and low temperature, but it has poor fuel permeation resistance and cannot withstand temperatures of 130° C. Polyamide resins are not known for use in fuel tanks. Some blow moldable polyamides have the required melt strength necessary to manufacture fuel tanks with good fuel barrier; however, they are marginal at continuous use exposure at high temperatures, and have very poor low temperature toughness. These blow moldable polyamides obtain their melt strength by i) having a very high molecular weight, or ii) epoxy cross-linking.

The addition of the fibrillatable fluoropolymer to enhance the melt strength of the thermoplastic polyamide composition is known in the art. However, this addition of fluoropolymer dramatically reduces toughness in the polyamide compositions, and the polyamide compositions are considered too brittle to be useful in their applications, such as fuel tanks.

Accordingly, the addition of fibrillatable fluoropolymer to the thermoplastic blow moldable polyamide compositions in the present invention does not reduce toughness significantly; the resins exhibit non-break notched Izod at −29° C., and pass the −40° C. drop test at 6 meters designed for fuel tanks.

Thus, the laminates of the present invention when made into large containers provide: 1) excellent melt strength to blow mold fuel tanks; 2) continuous use exposure at 130° C.; 3) low temperature impact strength; and 4) good fuel permeation resistance. All four characteristics are required for high temperature fuel tanks.

No other laminates in the prior art can provide all of the above characteristics.

SUMMARY OF THE INVENTION

Multilayer laminates which can be made into laminar articles such as fuel tanks, having resistance to permeation of fuel compositions are provided by the present invention. These laminates provide high temperature tensile properties and continuous use exposure at 130° C., low temperature toughness, good melt strength for fabrication, and good fuel permeation resistance.

More specifically, the present invention provides a multilayer laminate comprising at least two layers, wherein a first layer is a flexible thermoplastic blow moldable polyamide composition which comprises a substantially homogenous blend of (a) about 40–60 wt. % thermoplastic polyamide, (b) about 25–58 wt. % of a first ethylene copolymer selected from the group consisting of copolymers of ethylene and at least one alpha, beta ethylenically-unsaturated carboxylic acid having 3–8 carbon atoms and ionomers of said ethylene copolymers, and (c) about 1–20 wt. % of a second ethylene copolymer having interpolymerized units of ethylene and an alpha, beta ethylenically-unsaturated aliphatic epoxide, and a second layer is a vinyl alcohol composition selected from the group consisting of polyvinyl alcohol and copolymers of vinyl alcohol.

Optionally, these laminates may also contain in the thermopalstic blow moldable polyamide composition about 0.1–0.6 wt. % fibrillatable fluoropolymer. The addition of the fluoropolymer provides for excellent melt strength in the article; thus, these articles are particularly suited for large blow molded articles, such as fuel tanks for motor vehicles.

This invention also provides a process for making such an laminates.

DETAILED DESCRIPTION OF THE INVENTION

The articles of the present invention comprise at least two layers; generally, they may contain up to five layers. Two layers are preferred.

The first layer comprises a flexible thermoplastic blow moldable polyamide composition. These compositions possess a partially grafted structure and a polyamide continuous phase.

The partially grafted structure results from reaction of the ethylene/epoxide copolymer component of the composition with both the polyamide component and the ethylene/acid copolymer component. It is this morphological feature which is believed to be responsible for the combination of strength, flexibility and low temperature toughness exhibited by the laminates of the invention. Because the polyamide component is the continuous phase the compositions also exhibit excellent high temperature tensile strength, while the incorporation of fibrillar fluoropolymer imparts the melt strength necessary for blow moldability. By excellent high temperature strength it is meant that the laminates exhibit at least 30% retention of original elongation when tested at room temperature after aging at 150° C. for fourteen days. However, it should be noted that fuel permeation resistance is sacrificed due to the incorporation of the ethylene copolymer components, because the ethylene copolymers comprise at least 40% by weight of the total laminate.

Polyamide resins useful in the practice of the invention are well-known in the art and include those described in U.S. Pat. Nos. 4,174,358; 3,393,210; 2,512,606; 2,312,966; and 2,241,322. Included among these are semi-crystalline and amorphous resins having molecular weights of at least 5000 which may be produced for example by condensation polymerization of equimolar amounts of saturated dicarboxylic acids containing from 4 to 12 carbon atoms with diamines, by ring opening polymerization of lactams, or by copolymerization of polyamides with other components, e.g. to form polyether polyamide block copolymers. Examples of polyamides include polyhexamethylene adipamide (nylon 66), polyhexamethylene azelaamide (nylon 69), polyhexamethylene sebacamide (nylon 610), polyhexamethylene dodecanoamide (nylon 612), polydodecamethylene dodecanoamide (nylon 1212), polycaprolactam (nylon 6), polylauric lactam, poly-11-aminoundecanoic acid, and copolymers of adipic acid, isophthalic acid, and hexamethylene diamine. Preferred polyamides include those polyamides having melting points below 230° C., for example, nylon 6, nylon 612, and nylon 1212. The polyamide component of the composition should be present in amounts of about 40–60 wt. %, preferably 45–50 wt. %. If less than about 40 wt. % is present, the high temperature properties of the composition are compromised, whereas if greater than 60 wt. % is present low temperature toughness is compromised.

The ethylene/acid copolymer component of the composition is either a copolymer of ethylene and at least one alpha, beta ethylenically-unsaturated carboxylic acid or an ionomer thereof. The carboxylic acid may contain 3 to 8 carbon atoms, preferably 3–6 carbon atoms, and is present in the copolymer at levels of 5–15 wt. %. Examples of such copolymers include ethylene/acrylic acid, ethylene/methacrylic acid, ethylene/methacrylic acid/n-butyl acrylate, ethylene/acrylic acid/ethyl vinyl ether, ethylene/methyl acrylate/monoethyl hydrogen maleate, ethylene/ethyl acrylate/monoethyl hydrogen fumarate, and ethylene/itaconic acid. Preferably the ethylene/acid copolymer is a terpolymer of ethylene, an alkyl acrylate, and methacrylic acid, and most preferably, the alkyl acrylate is n-butyl acrylate because low temperature toughness is enhanced in such compositions.

Ionomers of the ethylene/acid copolymers may be used in place of the copolymers themselves. The acid groups of the ionomer are generally 10–90% neutralized with monovalent, divalent, or trivalent metal ions to form ethylene/acid copolymer salts. Preferably, the degree of neutralization is 50–90%. Suitable metal ions include sodium, zinc, aluminum, magnesium, potassium, calcium, and lithium. It is preferable that the ethylene/acid copolymer be an ionomer because higher strength is thereby imparted to the laminates of the invention. The ethylene/acid copolymer or ionomer is present in the compositions of this layer in amounts sufficient to provide adequate flexibility and low temperature properties, preferably about 20–58 wt. %.

An important feature of this layer is the presence in the composition of the ethylene/alpha, beta ethylenically-unsaturated aliphatic epoxide copolymer component. This copolymer is capable of undergoing grafting reactions with both the polyamide and the ethylene/acid copolymer component to form the partially crosslinked matrix which is believed to be responsible for the elastomeric properties associated with the thermoplastic polyamide compositions. The copolymer contains copolymerized units of ethylene and alpha, beta ethylenically-unsaturated aliphatic epoxides. The unsaturated epoxides contain 4–20 carbon atoms and are present in the ethylene copolymer at levels of 1 to 10 wt. %, preferably 3–6 wt. %. Representative example include glycidyl acrylate, glycidyl methacrylate, allyl glycidyl ether, vinyl glydicyl ether, glycidyl itaconate, and 3,4-epoxybutyl methacrylate. Preferably the copolymer also contains copolymerized units of $C_1$ to $C_{12}$ alkyl esters of either acrylic or methacrylic acid. When copolymerized alkyl acrylates or methacrylates are present in the copolymer it is preferred that they be present at levels of at least 20%. Examples of suitable monomers include, for example, methyl acrylate, ethyl acrylate, butyl acrylate, ethyl hexyl methacrylate, methyl methacrylate, dodecyl methacrylate, and dodecyl acrylate.

Butyl acrylate is preferred because low temperature impact is optimized in compositions of the invention when the ethylene/alpha, beta ethylenically-unsaturated aliphatic epoxide copolymer contains copolymerized butyl acrylate. Preferred ethylene copolymer grafting agents are ethylene/n-butyl acrylate/glycidyl methacrylate and ethylene/methyl acrylate/glycidyl acrylate. The level of ethylene/epoxide copolymer in the polymeric blend composition should be between about 1 and 20 wt. %. Levels of less than 1 wt. % result in insufficient grafting and levels higher than 20 wt. % result in so high a level of grafting that the compositions become intractable.

As mentioned hereinbefore, for large blow molded containers, a fibrillatable fluoropolymer is employed in the thermoplastic polyamide composition. The fibrillatable fluoropolymers useful in these compositions of this layer are preferably those tetrafluoroethylene polymers which are made by the dispersion or emulsion polymerization process, in which the polymer particles remain dispersed in the reaction mix during the polymerization. The particles fibrillate under the influence shear forces while being mixed with the polyamide and ethylene copolymer components of the composition. Fibrillatable fluoropolymers are well known in the art and are available commercially. Such compositions are, for example, described in U.S. Pat. Nos. 3,142,665 and 4,016,345. Commercially available types include Alphaflex ® polytetrafluoro-ethylene resin, available from Alphax Industries, Inc., and Teflon ® TFE fluorocarbon resin grades 6, 60, 6C and 62, available from E. I. Du Pont de Nemours and Company. The level of fibrillatable fluoropolymer in the polymeric blend ranges from about 0.1–0.6 wt. %. At these levels sag resistance and melt strength of the blend compositions are high enough so that they may be blow molded. Certain fibrillatable tetrafluoroethylene polymers, particularly those having high degrees of fibrillation, have a tendency to agglomerate on extrusion. It is therefore preferable to employ fibrillatable tetrafluoroethylene polymers having moderate degrees of fibrillation to prepare the blends so that the polymer blends are substantially homogeneous.

The polymer blends, i.e. alloys, of this layer are preferably produced by melt blending under high shear conditions. The separate ingredients may be combined as a pellet blend or they may be mixed via simultaneous or separate metering of the various components. They may also be divided and blended in one or more passes into one or more sections of high shear mixing equipment, for example extruders, Banbury mixers, or kneaders. High shear conditions insure that proper dispersion of the components occurs which promotes the grafting reaction and formation of the polyamide continuous phase.

Various commonly used additives such as antioxidants, pigments, plasticizers, and fillers may be added to the blends of this layer in quantities which will allow them to retain their flexibility. Such additives can be added in amounts up to 10 weight percent with no adverse effects.

The second layer comprises a vinyl alcohol composition which is selected from the group containing polyvinyl alcohol and copolymers of vinyl alcohol. Polyvinyl alcohol and copolymers of vinyl alcohol such as copolymers of vinyl alcohol containing up to about 10 weight percent of methyl acrylate, methyl methacrylate or other lower alkyl (meth)acrylates or ethylene/vinyl alcohol copolymers containing up to 50 mole percent ethylene, are normally made by polymerizing vinyl acetate alone or copolymerizing it with other monomers followed by saponification to obtain the corresponding polyvinyl alcohol homopolymer or vinyl alcohol copolymer. For use in the present invention the degree of saponification should be greater than 95% and preferably at least 99%. Typically these polymers have number average molecular weight of about 20,000 to 80,000, but their molecular weight is not critical to this invention. For use in the present invention it may be advantageous to incorporate minor amounts of plasticizers, compatible with polyvinyl alcohol and copolymers of vinyl alcohol to improve melt processing, other processing aids may also be used. Copolymers of ethylene vinyl alcohol are preferred.

Various commonly used additives such as antioxidants, stabilizers plasticizers, and fillers may be added to vinyl alcohol composition in quantities which will allow them to retain their flexibility. Such materials can be added in amounts up to 10 wt. % with no adverse effects.

The laminates of this invention can be prepared by coextruding a layer of the flexible thermoplastic polyamide composition described above with at least one second layer of the vinyl alcohol composition. The thermoplastic polyamide composition is formed in a first extruder as described hereinbefore, while, concurrently, the vinyl alcohol composition is melt extruded through a second extruder suitable for polyvinyl alcohol or copolymers of vinyl alcohol. As the two components are melted in their respective extruders, they are transported from a feed block or combining adaptor into a die where the two components, as coextruded layers, exit the die slot. The combining adaptor is adjusted so that the polyimide composition layer comprises 50 to 95 percent, more preferably 70 to 95 percent, of the thickness of the article. Containers such as bottles can be produced by coextruding the two or more layers to form a multiple layered parison which can be inflated in a suitable mold to form the desired article.

The thermoplastic polyamide layer and the vinyl alcohol layer do not require an adhesive tie layer.

These laminates exhibit resistance to permeation of fuel compositions. The vinyl alcohol layer gives the laminate the required permeation to fuel compositions. The laminates maximize the utilization of the vinyl alcohol composition in heavy walled containers which may be required for demanding applications such as fuel tanks and 55-gallon drums. At the same time, impact properties of blow molded tanks and drums and high temperature aging resistance are maintained because the majority of the wall thickness consists of thermoplastic polyamide. Thus, the laminates can be used without aid of heat deflection shields, which is not the case for the traditional HDPE mono-layer fuel tank.

The laminates of the present invention may be used as containers for hydrocarbon and hydrocarbons which contain oxygenated additives, such as alcohol, and also may be used to form sheets, films, tubes, pipes, and the like. A particularly contemplated use is for fuel tanks for motor vehicles. Such tanks require strength and toughness over a wide temperature range, and the laminates claimed here provide for such a use.

EXAMPLES

The following tests were used to evaluate the articles in the invention:

Hang Time—Pelletized polymer resin is fed to an extrusion blow molding machine equipped with a one-quart bottle mold. The hang time is the time measured in seconds which the extruded parison hands with good integrity and little sag before dropping from the accumulator head die. This test is a measure of the ability of the parison to maintain uniform wall thickness in production.

Melt Tension—Performed on a Gottfert Rheotens instrument used with a Gottfert Rheograph 2001 piston rheometer according to the standard procedures hiven in the instruction manuals for these pieces of equipment. The piston rheometer was run at 240° C. with a 2 mm diameter die 10 mm long a head speed of 0.067 mm/sec. The Rheotens instrument was run at takeaway speeds of 1 cm/sec.

Melt Draw—Performed on the Gottfert Rheotens instrument described for the melt tension test. A strand of polymer is fed from the capillary rheometer through a set of grooved wheels at a rate of 1 cm/s. Compositions which are able to maintain their integrity at this rate pass the test. Those which break fail the test. The test simulates the elasticity of the melt and allows one to assess the tendency of blow-molded parisons to break as they hang.

Bottle Drop—Seven 100 g one-quart blow-molded bottles are each filled with ethylene glycol and cooled to −20° C. by refrigeration for a period of 24 hours. Each bottle is then dropped from a height of 20 feet. Those which exhibit brittle shatter fail the test. This test measures low temperature impact strength and is a good comparsion to the −40° C. 10 meter fuel tank drop test used in the industry.

Tensile Strength—ASTM D412.

Elongation at Break—ASTM D412.

Xylene Permeation—Blow molded one-quart bottles are tested by ASTM method D2684-73 at 40° C. using 560 ml of xylene. Permeation is measured by bottle weight loss for a period of 28 days.

The following examples illustrate certain preferred embodiments of the invention wherein all amounts are in parts by weight.

EXAMPLE 1

To 45 parts of nylon 6 ($M_n$ 14,000) were added 39.8 parts of a 70% neutralized zinc ionomer of ethylene/24% n-butyl acrylate/8.5% methacrylic acid terpolymer (melt index 0.5 dg/10 min), 10 parts of an ethylene/28% n-butyl acrylate/5.2% glycidyl methacrylate terpolymer (melt index 20 dg/10 min), 1.0 parts zinc stearate, 2.0 parts Ampacet ® 19238 carbon black, 1.5 parts Irganox ® 1098 [N,N'-hexamethylene-bis-(3,5-di-t-butyl-4-hydrocinnamide], and 0.5 parts Irganox ® 1010, [tetrakis(methylene-3,5-di-t-butyl-4-hydroxyhydrocinnamate)methane]. This mixture was placed in a polyethylene bag and tumble-mixed until a homogeneous blend was obtained. The resultant dry blend was melt blended in a Werner and Pfleiderer twin screw extruder having a diameter of 28 mm and a length to diameter ratio of 27.5. The screw used was a general purpose screw with vacuum capability which consisted of elements to convey the feed material from the feed zone to a melting zone in which the material was compressed and melting commenced. A further section of kneading blocks followed be reverse elements provided high shear and pressure to continue the melting and mixing processes. The reverse elements also served to provide a melt seal following which the melt was decompressed in a vacuum section. Following the vacuum zone the melt was recompressed and passed through kneading blocks and reverse elements which provided a second vacuum seal. The melt was then further compressed and mixed as it passed through the extruder and out the die. The extruder barrel and die were set at a temperature of 235° C. and the resin was extruded at a rate of 7 kg/hr. Temperature of the melt exiting the extruder die was 270° C. The melt strand exiting the extruder was quenched in water and cut into pellets. The pelletized product was dried in a vacuum oven under nitrogen. This polyamide composition is the first layer of the two-layer co-blow molded structure. This layer has a thickness of 22-26 mil.

The second layer, which is the inner layer, is 3 mil thick and is a copolymer of 32 mole % ethylene, 68 mole % vinyl alcohol. This copolymer has a melt index of 3.0 dg/10 min.

Bi-layer one-quart bottles were produced from these two layers on a Continuous Extrusion Bekum Blow Molder (Model BM401) equipped with multiple extruders for coextrusion of several layers into a single parison for blow molding. Four extruders were used—two each for the vinyl alcohol composition and the thermoplastic polyamide composition. This was done to maximize the attainable wall thickness and is not inherent in this technology; i.e., a larger machine could produce samples with a thicker wall with a single extruder for each layer.

Sample condition for the vinyl alcohol composition extruders are:
Feeding Zone: 193° C.
Heat Zones: 235° C.
Pressure: 1-2 MPa
Screw RPM: 4
Melt Temp: 213° C.

Sample conditions for the polyamide compositions are:
Feeding Zone: 193° C.
Heating Zones: 235° C.
Pressure: 3-6 MPa
Screw RPM: 12-15
Melt Temp: 232° C.

Coextruder conditions:
Feeding Zone: 235° C.
Heating Zones: 235° C.
Continuous Extrusion Blow Molding Cycle:
Program Cycle Time: 11.8 sec
Delay Carriage Drop: 0.30 sec
Delay Cutting: 0.05 sec
Delay Blowing: 0.05 sec
Blowing Time: 7.00 sec
Stop Interval: 0.44 sec
Preblowing Interval: 0.30 sec
Blow Air Press: 0.59 MPa
Preblow Air Press: 0.14 MPa

COMPARATIVE EXAMPLE 2

The procedure described in Example 1 uses a single layer of the same ingredients as the polyamide composition layer. Thus, this was not co-blow molded with a vinyl alcohol layer.

Properties of a two-layer and a single layer container are shown in Table I, below:

TABLE I

|  | Example 1 | Comparative Example 2 |
|---|---|---|
| Hang Time (s, 240° C.) | 9 | 9 |
| Melt Tension (cN, 240° C.) | 0.4 | 0.4 |
| Melt Draw (1 cm/s, 240° C.) | pass | pass |
| Bottle Drop (6 m, −20° C.) | pass | pass |
| Stress/Strain Properties (ASTM D-412) | | |
| Original | | |
| $T_B$ (MPa) @ 23° C. | 35.2 | 35.2 |
| $T_B$ (MPa) @ 150° C. | 10.7 | 10.7 |
| $E_B$ (%) @ 23° C. | 300 | 300 |
| After Aging @ 150° C. for 14 days | | |
| $T_B$ (MPa) @ 23° C. | 34.1 | 34.1 |
| $E_B$ (%) @ 23° C. | 237 | 237 |
| % $E_B$ Retention | 79 | 79 |
| Xylene Permeation (gm. mil/day. 100 in², 28 days @ 40° C.) | 15 | 260 |

Note that the physical properties, low temperature bottle drop, and melt strength of the Comparative Example 2 are essentially the same as Example 1, since the outer layer is dominant in these properties. Hang time, melt tension, bottle drop, stress/strain, and heat aging properties were not measured directly on Example 1.

It can be seen in Table I that the xylene permeation of Comparative Example 2 is significantly higher than Example 1 due to the absence of the vinyl alcohol layer.

EXAMPLE 3

The procedure described in Example 1 is repeated using the same ingredients except that 0.25 parts of a fibrillatable polytetrafluoroethylene resin (Alphaflex I ® polytetrafluoroethylene resin) is added to the polyamide composition making up the outside layer of the colayer structure. The addition of this ingredient adds melt strength to the outside layer to permit the production of large blow molded parts. The expected properties of the two-layer container are shown in Table II:

TABLE II

|  | Example 3 |
|---|---|
| Hang Time (s, 240° C.) | >30 |
| Melt Tension (cN, 240° C.) | 4 |
| Bottle Drop (6 m, −20° C.) | pass |
| Stress/Strain Properties (ASTM D-412) | |
| Original | |
| $T_B$ (MPa) @ 23° C. | 34.1 |
| $T_B$ (MPa) @ 150° C. | 10.0 |
| $E_B$ (%) @ 23° C. | 257 |
| After Aging @ 150° C. for 14 days | |
| $T_B$ (MPa) @ 23° C. | 35.3 |
| $E_B$ (%) @ 23° C. | 166 |
| % $E_B$ Retention | 65 |
| Solvent Permeation (gm. mil/day. 100 in², 28 days @ 40° C.) | 15* |

The data in Table II indicate that the laminates of the invention combine excellent high temperature properties with good low temperature toughness, blow moldability and good resistance to permeation of fuel compositions. This is illustrated by a 65% retention of elongation at break after heat aging, 7 passes of the bottle drop test at −20° C., a hang time of more than 30 seconds, and a xylene permeation of 15 gm.mil/day.100 in².

We claim:

1. A multi-layer laminate comprising at least two layers, wherein a first layer is a flexible thermoplastic blow moldable polyamide composition which comprises a substantially homogeneous blend of
   (a) about 40-60 weight percent thermoplastic polyamide,
   (b) about 20-58 weight percent of a first ethylene copolymer selected from the group consisting of copolymers of ethylene and at least one α,β ethylenically-unsaturated carboxylic acid having 3-8 carbon atoms, and ionomers of said ethylene copolymers,
   (c) about 1-20 weight percent of a second ethylene copolymer having interpolymerized units of ethylene and an α,β ethylenically-unsaturated aliphatic epoxide, and a second layer is a vinyl alcohol composition selected from the group consisting of polyvinyl alcohol and copolymers of vinyl alcohol.

2. The laminate of claim 1 wherein the first ethylene copolymer is an ionomer of a terpolymer containing copolymerized units of ethylene, n-butyl acrylate, and methacrylic acid.

3. The laminate of claim 1 wherein the polyamide is nylon 6, nylon 612, or nylon 1212.

4. The laminate of claim 1 wherein the vinyl alcohol composition is a copolymer of ethylene vinyl alcohol.

5. The laminate of claim 1 wherein the first ethylene copolymer is an ionomer.

6. The laminate of claim 5 wherein the ionomer is 50-90% neutralized with metal ions.

7. The laminate of claim 1 wherein the second ethylene copolymer contains copolymerized units of glycidyl methacrylate.

8. The laminate of claim 7 wherein the ethylene copolymer is ethylene/n-butyl acrylate/glycidyl methacrylate.

9. The laminate of claim 1 wherein the first layer comprises 0.1-0.6 weight percent fibrillatable fluoropolymer.

10. The laminate of claim 9 wherein the fluoropolymer is fibrillstable polytetrafluoroethylene.

11. Articles made from the laminate of claim 9.

12. The laminar article of claim 11 in the form of a fuel tank for motor vehicles.

13. The laminate of claim 1 wherein the polyvinyl alcohol is at least about 95 percent saponified.

14. The laminate of claim 13 wherein the polyvinyl alcohol is at least about 99 percent saponified.

15. Articles made from the laminate of claim 1.

16. The laminar article of claim 15 in the form of a container.

17. A process for preparing a laminated article comprising the steps of
   i) melting a flexible thermoplastic blow moldable polyamide composition in a first extruder, and concurrently
   ii) melting a vinyl alcohol composition in a second extruder
   iii) transporting the polyamide composition and the vinyl alcohol composition from a feed block into a die;
   iv) exiting the thermoplastic polyamide composition and the vinyl alcohol composition as coextruded layers from a die slot.

* * * * *